United States Patent Office 2,735,418
Patented Feb. 21, 1956

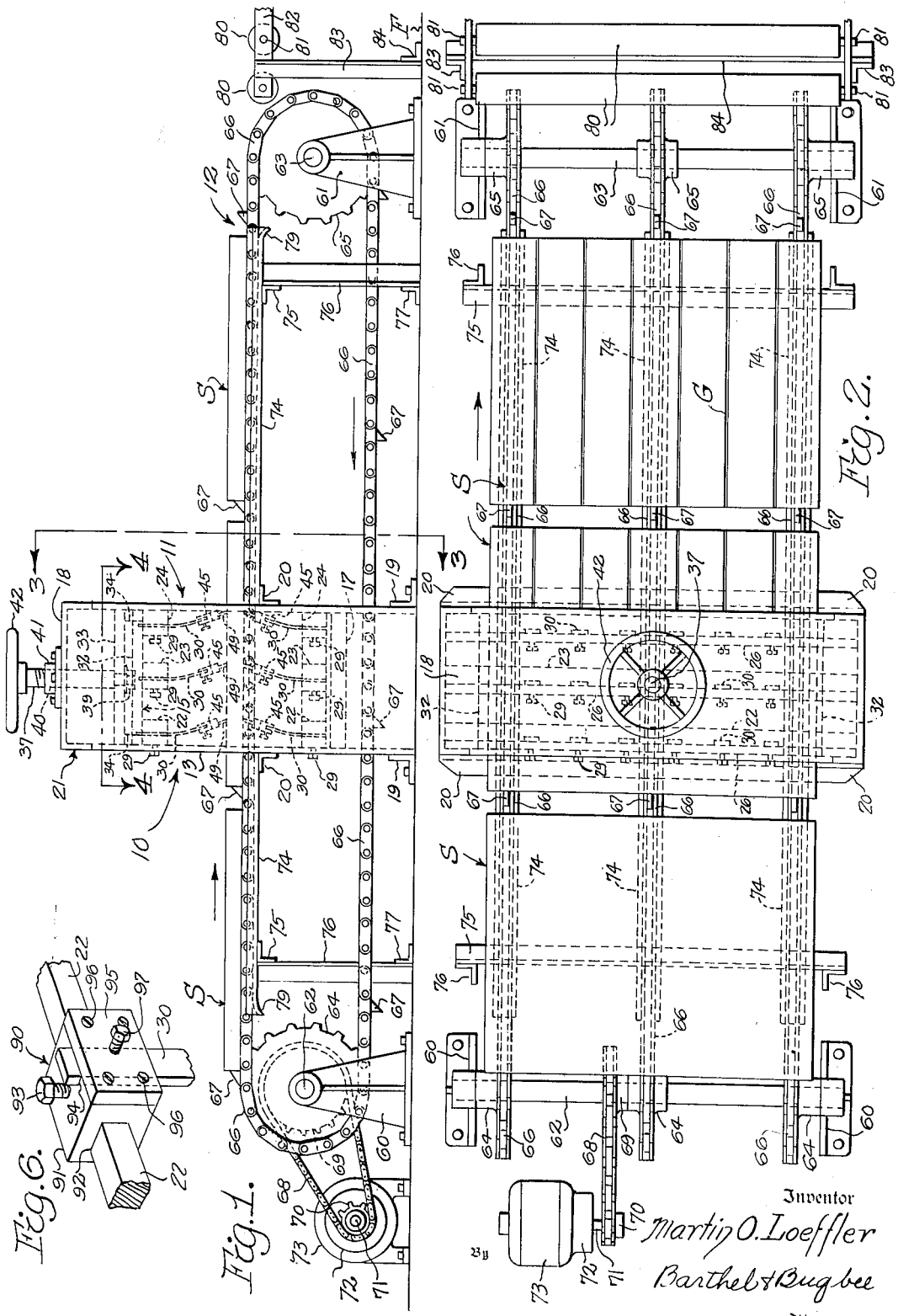

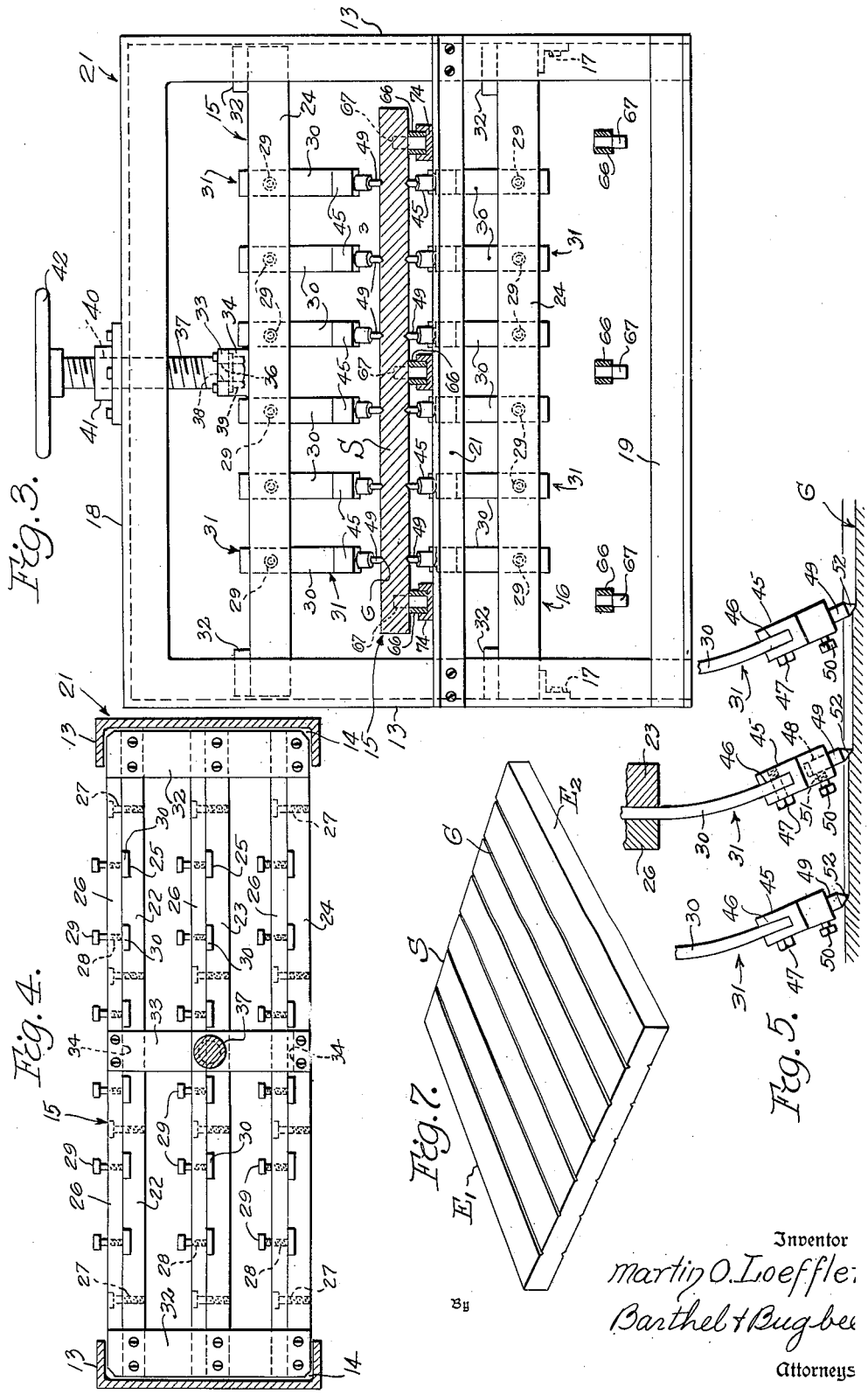

2,735,418

STONE GROOVING MACHINE

Martin O. Loeffler, Detroit, Mich.

Application February 2, 1953, Serial No. 334,679

2 Claims. (Cl. 125—9)

This invention relates to stone working machinery, and, in particular, to stone grooving machines.

One object of this invention is to provide a stone slab grooving machine for cutting grooves in slabs of stone preparatory to separating the slabs either into smaller strips or into flagstones, the machine being adapted automatically to compensate for surface irregularities or thickness variations in the stone by the use of resiliently mounted yieldable cutters.

Another object is to provide a stone slab grooving machine which will rapidly form one or more grooves in a stone slab while the slab is being carried beneath one or more cutters, several cutters being preferred for forming each groove, with the cutters tracking one another at different depths so as to distribute the cutting work proportionately between the several cutters.

Another object is to provide a stone slab grooving machine of the foregoing character wherein the cutters project upward and downward into engagement with the upper and lower surfaces of the slab, the upper cutters being mounted on a head which is movable upward or downward in vertical guideways so as to adjust the depth of cut and adapt the cutters to different thicknesses of slabs, the slab being carried past the cutters by means of a conveyor, such as by endless chains or their equivalent.

In the drawings:

Figure 1 is a side elevation of a stone slab grooving machine, according to one form of the invention, with one of the frame uprights broken away to show the cutters;

Figure 2 is a top plan view of the stone slab grooving machine shown in Figure 1;

Figure 3 is a vertical section taken along the line 3—3 in Figure 1, showing details of the cutters and their mountings;

Figure 4 is a horizontal section taken along the line 4—4 in Figure 1, showing the upper cutter head in top plan view;

Figure 5 is an enlarged side elevation, partly in vertical section, of the three cutters shown in the upper portion of Figure 1, showing the progressively increasing cutter depth settings to proportion the work load between the cutters;

Figure 6 is a fragmentary perspective view of a modification of the invention, wherein the cutter is adjustable horizontally as well as vertically in position; and Figure 7 is a perspective view of a stone slab after it has been scored by the machine of Figures 1 to 6 inclusive.

General arrangement

Hitherto there has been a demand for small strips of relatively thin stone for facing buildings, such as houses, these pieces of stone being laid up much in the manner of laying brick against the outer surface of the building. Up to the present time, however, the production of the stone pieces has been costly and uncertain because it has been necessary to cut them out of the quarried slabs by grooving them manually with chisels and then breaking the slab manually along the grooved lines. The difficulty and cost of this operation have been increased by the fact that the stone slabs as they come from the quarry vary in thickness in different portions of the slab and also present other irregularities, such as humps and hollows in the surface of the slab.

The machine of the present invention provides a semi-automatic mechanism by which the stone slabs are grooved rapidly and evenly, notwithstanding the variations in surface flatness or slab thickness. In brief, the machine consists of a framework having spaced upper and lower cutter heads between which the slabs are carried by a conveyor and subjected to the action of resiliently mounted cutters projecting downward from the upper cutter head and upward from the lower cutting head. At least one of the cutter heads, and preferably the upper cutter head, is adjustable vertically to adapt it to different thickness of slabs, and the cutters are resiliently mounted so that surface or thickness variations in a given slab are automatically compensated for.

Cutting unit

Referring to the drawings in detail, Figures 1 to 4 inclusive show a stone slab grooving machine, generally designated 10, according to one form of the invention, as including a generally vertical cutting unit, generally designated 11, to which the stone slabs S are fed by a generally horizontal conveyor unit 12. The cutting unit 11 consists of spaced parallel uprights 13, preferably of channel steel (Figure 4) with the channels 14 thereof facing one another so as to provide guideways for a vertically movable upper cutter head 15 and also to provide lodgment for a stationary lower cutter head 16. The lower cutter head is mounted in any suitable way, such as by the angle members 17 (Figure 3). The uprights 13 are interconnected by upper and lower cross members 18 and 19 and by intermediate cross members 20, the latter being of angle steel bars. The cross members 18, 19 and 20 are riveted, bolted or otherwise suitably secured to the uprights 13, so as to form a rigid cutter supporting framework, generally designated 21.

The upper and lower cutter heads 15 and 16 are of similar construction, hence a single description will suffice for both. Each cutter head consists of a plurality of elongated bars 22, 23 and 24 (Figure 4) although a greater or lesser number may be used. These bars are slotted vertically as at 25, the slots extending inward from one edge of each bar with the open side closed by a smaller bar 26 bolted or otherwise secured thereto as at 27. Each of the bars 26 is drilled and threaded as at 28 opposite each slot 25 to receive set screws 29 by which the shanks 30 of the cutters 31 are clamped in the slots 25. The bars 22, 23 and 24 are maintained in spaced parallel relationship by cross bars 32 bolted, riveted or otherwise secured to the opposite ends thereof. The central cross bar 33 is also bolted or riveted to the bosses 34 rising from the bars 24 and 26.

The cross bar 33 contains a bore 38 which receives the reduced diameter end portion 36 of a screw shaft 37 which is threaded to receive a retaining nut 39. In this manner, a relatively rotatable connection is maintained between the screw shaft 37 and the upper cross head 15. The screw shaft 37 passes through the threaded bore 40 of a flanged nut 41 which is bolted or otherwise firmly secured to the upper cross bar 18. The upper end of the screw shaft 37 is provided with a hand wheel 42 by which the screw shaft 37 may be rotated to raise and lower the upper cross head 15. As previously stated, the lower cross head 16 is of similar construction to the upper cross head 15, except that it lacks the raising and lowering mechanism.

Each cutter 31, in addition to the shank 30 which is of spring steel resembling automobile leaf spring stock, includes a chuck 45 having a socket or recess 46 in the upper end for receiving the lower end of the shank 30, and secured thereto as by the bolt 47. The chuck 45 at its lower end is provided with a recess 48 in which the cutting tool or cutting blade 49 is seated and held in position by a set screw 50 threaded into the threaded bore 51. The cutting blade 49 has a sharp tip 52 which is preferably of tungsten carbide or other suitable hard cutting material. As shown in Figure 5, the three rows of cutters 31 are so mounted that their cutting blades 49 track and are set at progressively increasing depths so that the forward blade 49 cuts a shallow groove, the depth of which is increased by the intermediate cutting blade 49 which, by reason of its deeper setting, increases the depth of cut. This deepened groove is, in turn, still further deepened by the rearmost cutter 31, the cutting blade 49 of which is set at a still greater depth.

*Conveyor unit*

The conveyor unit 12 may be of any desired length, it being shown in Figure 1 as somewhat short for convenience of illustration. The conveyor unit 12 is supported at its opposite ends by upwardly extending pairs of bearing brackets 60 and 61 respectively mounted on opposite sides of the cutting unit 11. The bearing brackets 60 and 61 of each pair are spaced laterally apart from one another. Journaled in the upper ends of the bearing brackets 60 and 61 are horizontal transverse shafts 62 and 63 (Figures 1 and 2), the former of which carries three laterally-spaced sprockets 64 and the latter of which carries three similar laterally-spaced sprockets 65. Trained over these sprockets 64 and 65 are three corresponding endless sprocket chains 66 carrying spaced lugs 67 which serve to propel the stone slabs S in a direction indicated by the arrows in Figures 1 and 2. The shaft 62 is driven by a sprocket chain 68 trained around a sprocket 69 mounted thereon. The sprocket chain 68 in turn encircles a sprocket 70 (Figure 1) mounted on the output shaft 71 of a reduction gear box 72 connected either as an integral part of an electric motor 73 or a separate unit driven thereby.

The upper courses of the endless chains 66 are supported by elongated supporting bars 74, one for each chain 66, these bars 74 in turn being supported by cross bars 75 of angle steel secured to the upper ends of uprights 76, the lower ends of which are provided with similar cross bars 77 by which they are secured to the floor F. The framework 11 is similarly secured to the floor F by angle steel members 19 bolted or otherwise secured to the opposite sides of the uprights 13. The opposite ends of the elongated bars 74 are bent downwardly as at 79. The slabs S, after scoring, pass on to spaced rollers 80 mounted on axles 81 supported in horizontal bars 82 mounted on the upper ends of uprights 83 at approximately the same height as the chains 74. Angle members 84 (one only being shown) provide means for securing the uprights 83 to the floor.

The modified tool holder, generally designated 90, shown in Figure 6 provides lateral adjustment for the cutting tools 31 along the bars 22 which, in this modification, are smooth and lack the slots 25. Instead, blocks 91 are slidably mounted on the bars 22 by being provided with bores 92 loosely and slidably fitting the bar 22, both being preferably of non-circular cross-section to prevent swinging of the block 91 around the bar 22. A set screw 93 enables the block 91 to be clamped at any location along the bar 22, and a vertical slot 94 receives the shank 30 of the cutting tool 31. A closure plate 95, secured as at 96 to the block 91, retains the tool 31 in position, and a set screw 97 engages the shank 30 and locks it in place.

*Operation*

In the operation of the stone slab grooving machine 10 of this invention, let it be assumed that the cutting tools 49 on the lower cutters 31 have been adjusted in the lower cutter head 16 so that their cutting points 52 project a sufficient distance above the tops of the upper courses of the chains 66 to form the desired depth of groove G (Figure 7). Let it also be assumed that the cutters 31 are spaced laterally far enough apart to space the grooves G the desired distances from one another. The successive cutters 31 are then adjusted so as to take proportionate amounts of this total depth of cut of the groove G so as to distribute the work between them, as shown in Figure 5. This procedure is then repeated for the upper cutters 31 mounted in the upper cutter head 15, so that these are not only spaced directly above the lower cutters 31 but also are adjusted in their three rows so that each tool or blade 49 bears its proportional amount of the cutting load. Obviously, if the cutters 31 are arranged in more or less rows than the three rows shown, the depth of cut taken by each row will be proportionately varied.

The machine 10 is then adjusted by means of the hand wheel 42 so that the cutter blades 49 of the cutters 31 in the upper cutter head 15 enter the surface of the slab S to the desired depth for the particular thickness of slab being grooved. The operator then starts the machine and he or his assistants load the slabs S successively onto the conveyor chains 66. As these move in the direction of the arrows (Figures 1 and 2), they carry the slabs S between the upper and lower cutter heads 15 and 16, the cutting blades 49 of which cut upper and lower grooves G in the slab as it is pushed beneath them by the lugs 67 attached to the chains 66. The first row of cutting blades 49 cut shallow grooves, the depths of which are increased by the more deeply set cutting tools 49 of the second rod of cutters 31, this depth of groove being still further increased by the still more deeply set cutting blades of the third row of cutters 31. As the slabs S pass between the upper and lower cutters 31, these yield as the thickness of the slab increases slightly and spring back as it diminishes, due to the resilience of their spring shanks 30. In this manner, slight variations in the thickness of the slab S are automatically taken care of and a properly grooved slab S still results. If the thickness of the slab S changes a sufficient amount to require readjustment of the upper cutters 31 on the upper cross head 15, the latter may be moved upward or downward by turning the hand wheel 42. In this manner, the slabs S may be grooved rapidly and cheaply, preparatory to separating them into strips. Optionally, only a portion of the slab S may be grooved, the remainder being kept intact to serve as a flagstone or the like.

To separate the slabs S into strips, one edge of the slab S is preferably raised above the ground or bed on which the slab is placed, leaving the slab unsupported except at its opposite edges $E_1$ and $E_2$ which are parallel to the grooves G. The slab S may then be split either manually by chisels or by power-operated splitting tools or hammers, depending upon the method most desired for the particular kind of stone. The separation of the grooved slab into its component strips is beyond the scope of the present invention and several ways of doing this are well known to those skilled in the quarrying and stone cutting art.

What I claim is:

1. A stone slab grooving machine comprising an elongated framework having an opening with a stone slab path therethrough for the passage of the stone slabs while being grooved, a pair of grooving tool carriers disposed in said framework on opposite sides of said path and facing opposite sides of the slabs traversing said path, a multiplicity of resilient grooving tool supports mounted on each tool carrier in transversely-spaced relationship and directed toward opposite sides of said slabs traversing said slab path through said opening, a multiplicity of stone slab grooving tools mounted on said tool supports and projecting into said opening into engagement with the opposite sides of slabs passing therethrough along said slab path, said tools having grooving tips spaced transversely apart from one another at the predetermined separations desired for the slab grooves, a movable conveyor extending to and away from said framework opening at opposite sides thereof and arranged to move the slabs to be grooved along said slab path through said opening and past said grooving tools, and a power source drivingly connected to said conveyor, said grooving tool supports comprising leaf springs mounted on said tool carrier and holding said grooving tools.

2. A stone slab grooving machine comprising an elongated framework having an opening with a stone slab path therethrough for the passage of the stone slabs while being grooved, a pair of grooving tool carriers disposed in said framework on opposite sides of said path and facing opposite sides of the slabs traversing said path, a multiplicity of resilient grooving tool supports mounted on each tool carrier in transversely-spaced relationship and directed toward opposite sides of said slabs traversing said slab path through said opening, a multiplicity of stone slab grooving tools mounted on said tool supports and projecting into said opening into engagement with the opposite sides of slabs passing therethrough along said slab path, said tools having grooving tips spaced transversely apart from one another at the predetermined separations desired for the slab grooves, a movable conveyor extending to and away from said framework opening at opposite sides thereof and arranged to move the slabs to be grooved along said slab path through said opening and past said grooving tools, and a power source drivingly connected to said conveyor, said grooving tool supports comprising leaf springs, each spring being secured at one end to said tool carrier in cantilever arrangement and each grooving tool being secured to one of said leaf springs at the opposite end thereof from the end secured to said tool carrier.

References Cited in the file of this patent

UNITED STATES PATENTS

| | | |
|---|---|---|
| 298,598 | Mann | May 13, 1884 |
| 550,004 | Morton | Nov. 19, 1895 |
| 2,000,779 | Miller | May 7, 1935 |
| 2,058,727 | Schreiber | Oct. 27, 1936 |
| 2,178,257 | Griswold | Oct. 31, 1939 |
| 2,319,154 | Orlow | May 11, 1943 |

FOREIGN PATENTS

| | | |
|---|---|---|
| 34 | Great Britain | Jan. 4, 1876 |